United States Patent
Doo et al.

(10) Patent No.: US 9,337,558 B2
(45) Date of Patent: May 10, 2016

(54) CONNECTOR ROD ASSEMBLY FOR AC INVERTER OUTPUT

(71) Applicant: GM GLOBAL TECHNOLOGY OPERATIONS LLC, Detroit, MI (US)

(72) Inventors: Young M Doo, La Palma, CA (US); Jimmy M Chang, Rancho Palos Verdes, CA (US); Anthony P. Tata, Fenton, MI (US); Mark D. Korich, Chino Hills, CA (US); Robert T. Dawsey, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 695 days.

(21) Appl. No.: 13/651,503

(22) Filed: Oct. 15, 2012

(65) Prior Publication Data

US 2014/0103758 A1    Apr. 17, 2014

(51) Int. Cl.
*H01R 13/73* (2006.01)
*H01R 4/60* (2006.01)
*B60L 11/18* (2006.01)

(52) U.S. Cl.
CPC .............. *H01R 4/60* (2013.01); *B60L 11/1803* (2013.01); *B60L 11/1887* (2013.01); *H01R 2201/06* (2013.01); *Y02T 90/34* (2013.01)

(58) Field of Classification Search
USPC .................................. 310/71, 68 D
See application file for complete search history.

(56) References Cited

U.S. PATENT DOCUMENTS

| | | | | |
|---|---|---|---|---|
| 3,842,302 | A * | 10/1974 | Apostoleris | 310/239 |
| 4,806,814 | A * | 2/1989 | Nold | 310/68 D |
| 5,814,911 | A * | 9/1998 | Daniels | 310/68 R |
| 6,296,497 | B1 * | 10/2001 | Xu | 439/89 |
| 6,909,208 | B2 * | 6/2005 | Suzuki et al. | 310/49.13 |
| 7,208,855 | B1 * | 4/2007 | Floyd | 310/71 |
| 2002/0043883 | A1 * | 4/2002 | Shimizu | 310/71 |
| 2002/0047363 | A1 * | 4/2002 | Kloeppel et al. | 310/71 |
| 2005/0206349 | A1 * | 9/2005 | Raszkowski et al. | 322/15 |
| 2008/0143203 | A1 * | 6/2008 | Purvines et al. | 310/71 |
| 2009/0034310 | A1 * | 2/2009 | Ward et al. | 363/144 |
| 2010/0255686 | A1 * | 10/2010 | Doo et al. | 439/34 |
| 2011/0114397 | A1 * | 5/2011 | Ryu et al. | 180/65.1 |
| 2013/0257201 | A1 | 10/2013 | Lemke et al. | |

FOREIGN PATENT DOCUMENTS

AT          011844 U1    5/2011
DE    102008035232 A1    2/2009

* cited by examiner

*Primary Examiner* — Naishadh Desai
(74) *Attorney, Agent, or Firm* — Quinn Law Group, PLLC

(57) ABSTRACT

An electrical system includes an alternating current (AC) connector rod assembly and a polyphase electric machine. The electric machine has a plurality of phase leads each electrically connected to the AC connector rod assembly. The assembly includes spaced AC connector rods each having a center axis. The assembly also includes insulating housings and a carrier plate defining through holes that receive and space the AC connector rods. The carrier plate defines features that engage mating features of the insulating housings while allowing each of the rods to rotate about its respective center axis within the carrier plate. A vehicle includes a direct current (DC) battery pack, a DC bus, an AC bus, a PIM that is electrically connected on a first side to the DC bus and on a second side to the AC bus, the AC connector rod assembly, a traction motor, and a transmission.

10 Claims, 2 Drawing Sheets

US 9,337,558 B2

CONNECTOR ROD ASSEMBLY FOR AC INVERTER OUTPUT

TECHNICAL FIELD

The present disclosure relates to a connector rod assembly for an AC output side of a power inverter module.

BACKGROUND

A DC battery pack can be used in an electromechanical system to energize a polyphase electric machine. In such a system, a power inverter module (PIM) converts the DC output of the battery pack, typically via high-speed semiconductor switching, into AC power suitable for driving the electric machine. The same inverter module may be used to convert AC power into DC power for recharging the battery pack. For this reason, PIMs are used as an integral component of hybrid electric, extended-range electric, and battery electric vehicle powertrains.

SUMMARY

An electrical system is disclosed herein that includes an AC connector rod assembly and a polyphase electric machine. The electric machine has multiple phase leads each connected to a power inverter module (PIM) via the AC connector rod assembly. The AC connector rod assembly may include spaced AC connector rods, a carrier plate that receives and spaces the AC connector rods, and multiple insulating housings. The carrier plate defines a set of features, e.g., snap fingers, that engages a mating set of features of the insulating housings, for instance a circumferential groove, while still allowing each of the AC connector rods to rotate about its respective center axis within the carrier plate.

A vehicle is also disclosed herein. The vehicle may include a DC battery pack, a DC bus that is electrically connected to the DC battery pack, an AC bus, and a PIM that is electrically connected on a first side to the DC bus, and on a second side to the AC bus. The vehicle also includes an AC connector rod assembly and a transmission having an output member and a three-phase electric traction motor. The motor generates output torque to the output member, and has three-phase leads that are electrically connected to the PIM via the AC connector rod assembly. The AC connector rod assembly includes three spaced AC connector rods, a carrier plate defining three through holes that receive and space the AC connector rods, and three insulating housings. Each of the insulating housings circumscribes a respective one of the AC connector rods, while the carrier plate defines three bosses each having a flexible tabular extension. A free end of the tabular extensions engages the insulating housings while allowing each of the AC connector rods to rotate about its respective center axis within the carrier plate.

An AC connector rod assembly is also disclosed herein for use with a polyphase electric machine. The assembly includes spaced AC connector rods each having a center axis, a carrier plate defining through holes that receive and space the AC connector rods, and a plurality of insulating housings. The housings each circumscribe a respective one of the AC connector rods and define a slot. The carrier plate defines a plurality of bosses each having a tabular extension. The tabular extensions engage a respective one of the slots defined by the insulating housings while still allowing each of the AC connector rods to rotate about its respective center axis within the carrier plate.

The above features and advantages and other features and advantages of the present invention are readily apparent from the following detailed description of the best modes for carrying out the invention when taken in connection with the accompanying drawings.

DETAILED DESCRIPTION

Figure 1:
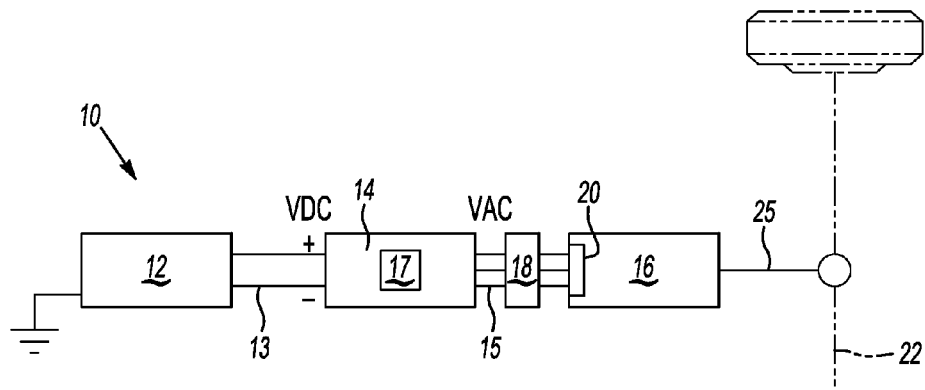
FIG. 1 is a schematic illustration of an electrical system having an AC connector rod assembly as described herein.

Referring to the drawings, wherein like reference numbers refer to like components throughout the several Figures, an example electrical system 10 is shown schematically in FIG. 1. The electrical system 10 includes a direct current (DC) power supply 12, e.g., a multi-cell battery pack, a fuel cell, etc., a power inverter module (PIM) 14, a polyphase electric machine 16, and an alternating current (AC) connector rod assembly 18. The AC connector rod assembly 18, which is described in detail below with reference to FIGS. 2-4, connects the PIM 14 to an electrical terminal block 20 of the electric machine 16, and thereby connects the PIM 14 to the various phase leads of the electric machine 16.

The electric machine 16 draws electrical energy from and delivers electrical energy to the DC power supply 12 as needed. The DC power supply 12 thus performs an energy storage function in any larger system in which the electrical system 10 is employed, for instance within a vehicle powertrain as shown in phantom in FIG. 1. In such an embodiment, the electric machine 16 may be one or more high-voltage traction motors, e.g., 60 VDC to 300 VDC or more. In this configuration, the electric machine 16 could be used to generate motor torque sufficient for propulsion.

That is, motor output torque from the electric machine(s) 16 may be delivered to a drive axle(s) 22 via a motor output shaft 25, directly or through one or more gear sets, and ultimately to a set of drive wheels 24. Other vehicular and non-vehicular uses of the electrical system 10 may be readily envisioned, and therefore the example vehicle embodiment of FIG. 1 is just one possible beneficial application of the electrical system 10.

The PIM 14 of FIG. 1 is electrically connected to the DC power supply 12 over positive (+) and negative (−) rails of a DC bus 13, and to the electric machine 14 via a corresponding AC bus 15. Operation of the PIM 14 may be controlled via a switching control block 17, e.g., a set of high-speed insulated gate bipolar resistors (IGBTs), metal-oxide-semiconductor field-effect-transistors (MOSFETs), or other semiconductor switching components, via pulse-width modulation. In this manner, the PIM 14 is able to convert DC power (VDC) from the DC power supply 12 into AC power (VAC) suitable for powering the electric machine 16, as well as convert AC power to DC power suitable for storage in the DC power supply 12.

Figure 2:
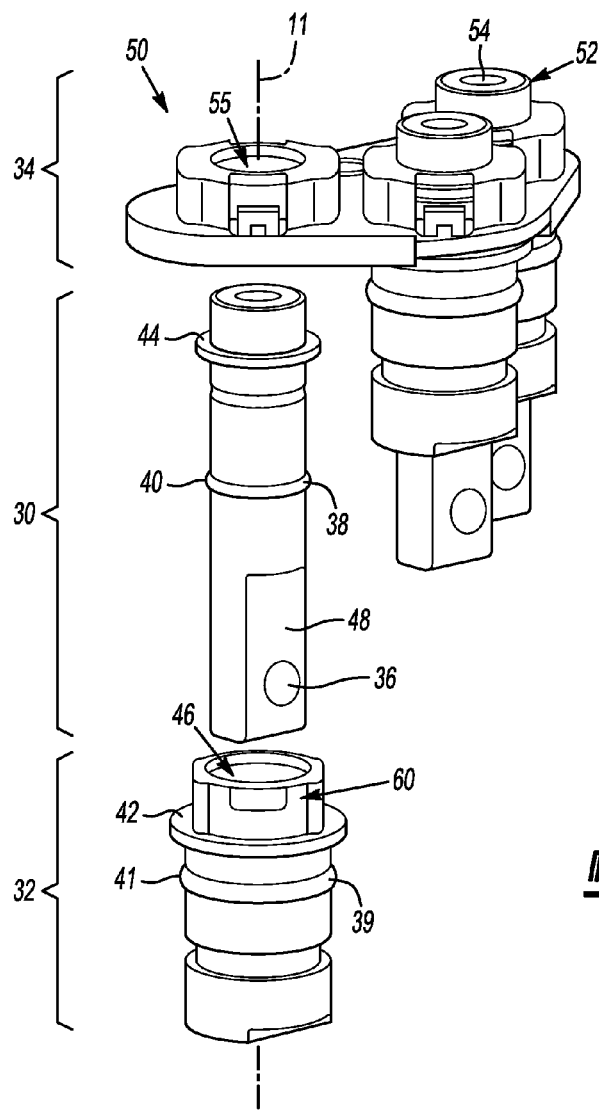
FIG. 2 is a schematic exploded view illustration of an AC connector rod assembly that can be used within the electrical system shown in FIG. 1.

Referring to FIG. 2, the AC connector rod assembly 18 of FIG. 1 is shown in exploded view to more clearly illustrate its constituent parts. The assembly 18 includes a plurality of AC connector rods 30 each having a center axis 11. The plurality equals the number of phase of the electric machine 16, e.g., three in a typical three-phase AC embodiment. The assembly 18 also includes a plurality of insulating housings 32, with one insulating housing 32 used per rod 30, and a carrier plate 34 that groups and spaces the insulating housings 32 and rods 30 with respect to each other.

The carrier plate 34 shown in FIG. 2 may be formed from injection molded plastic in a particular embodiment. The carrier plate 34 defines a set of through holes 55. Each through hole 55 of the carrier plate 34 receives a corresponding one of the AC connector rods 30 without impinging rotation of the rods 30 about its axis 11, one of which is shown for simplicity in FIG. 2, with respect to the carrier plate 34. Additionally, the carrier plate 34 defines a set of bosses 50, i.e., a raised surface or protuberance as shown in FIG. 2, each having a feature 62 that engages a mating feature 60 of a corresponding one of the insulating housings 32. Such engagement allows each of the rods 30 to rotate freely and separately within the carrier plate 34 about its respective center axis 11 as needed, particularly during installation.

Each of the AC connector rods 30 of FIG. 2 may be constructed of aluminum, although other materials may be used depending on the application. Each connector rod 30 defines a flange 44 in proximity to an end 52. Each connector rod 30 also defines a circumferential groove 38 at an approximate axial midpoint of the connector rod 30. An o-ring 40 or other suitable fluid seal may be seated within the circumferential groove 38 to form a sufficient static fluid seal between the connector rod 30 and the corresponding insulating housing 32 within which the connector rod 30 is positioned.

At another end of the connector rod 30 opposite that of the flange 44, the connector rod 30 may include an optional set of flattened side walls 48 defining a bore 36. The flattened side walls 48 of the rod 30 extend axially outward from the insulating housing 32 as shown in FIG. 2, and ultimately connects, via the bore 36 and a terminal block 20 of the electric machine 16 as shown in FIG. 1, to one of the phase leads of the electric machine 16. A recess 54 in the end 52 of the rod 30 may be threaded to receive a particular fastener, e.g., an M6 bolt, for connection of the assembly 18 to the PIM 14.

The insulating housing 32 is also shown in FIG. 2. Each insulating housing 32 may be constructed of injection molded plastic of like or similar grade to that of the materials used to form the carrier plate 34. As used herein, the term "insulating" refers to dielectric properties of the insulating housing 32. Thus, the insulating housing 32 helps to electrically insulate the AC connector rods 30 from the surrounding environment. Each insulating housing 32 also defines a center bore 46 through which a corresponding one of the rods 30 is inserted during assembly.

The insulating housings 32 of FIG. 2 also define a circumferential groove 41 within which another o-ring 39 is seated. The o-ring 39 circumscribing the insulating housing 32 as shown in FIG. 2 may function as a static fluid seal in certain applications, for instance when the AC connector rod assembly 18 is used within an automotive powertrain. Such an embodiment is explained in further detail below with reference to FIG. 4.

Additionally, each of the insulating housings 32 may define a flange 42. The flange 42 has an outer diameter that is larger than the diameter of the through holes 55 of the carrier plate 34. The design of the flanges 42 of the collective set of insulating housings 32 thus allows the carrier plate 34 to capture and retain the AC connector rods 30 and corresponding insulating housings 32, and thus facilitates assembly and installation.

Figure 3:
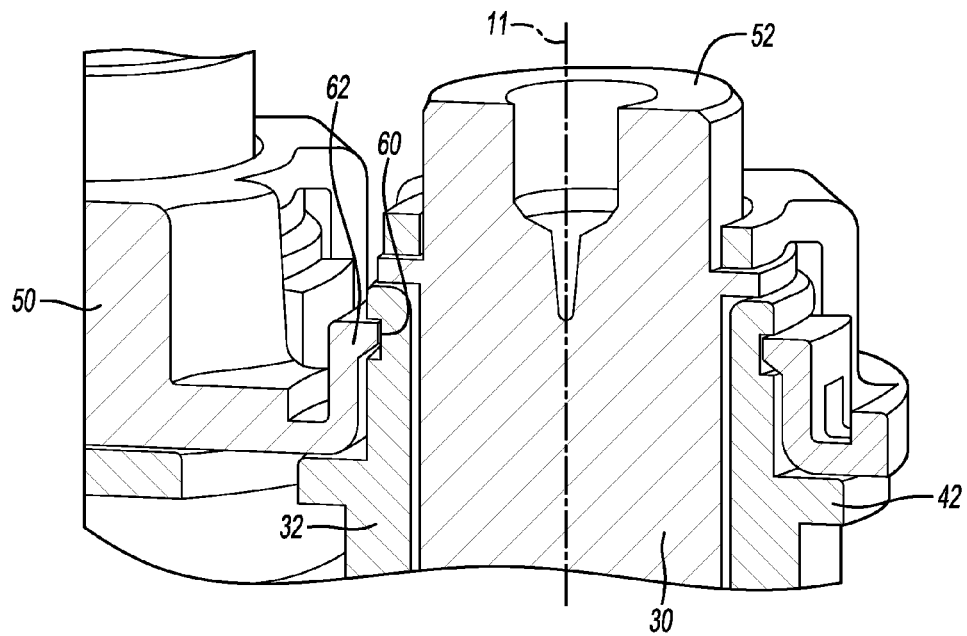
FIG. 3 is a schematic cross sectional perspective view of a portion of the AC connector rod assembly shown in FIG. 2.

Referring to FIG. 3, the carrier plate 34 is shown in an installed position relative to a pair of the AC connector rods 30. Each boss 50 of the insulating housings 32 defines a feature 60 that receives a mating feature 62 of the carrier plate 34. In the example embodiment shown in FIG. 3, the mating feature 60 of the insulating housing 32 is a slot that is formed in or otherwise defined by the material of the insulating housing 32. The feature 62 of the boss 50 is a sufficiently flexible, tabular extension of the carrier plate 34, e.g., a flexible arm or finger-like projection that can flex relative to the insulating housing 32 during installation. Ultimately, the feature 62 is received by and snaps into the mating feature 60, thereby securing the AC connector rod 30 and corresponding insulating housing 32 to the carrier plate 34. The size and shape of the flanges 42 and 44 helps to prevent undesirable motion of the AC connector rod 30 along the axis 11, while still allowing the AC connector rods 30 the freedom to rotate about the axis 11 within the through holes 55 of the carrier plate 34 as needed during assembly and installation.

Figure 4:
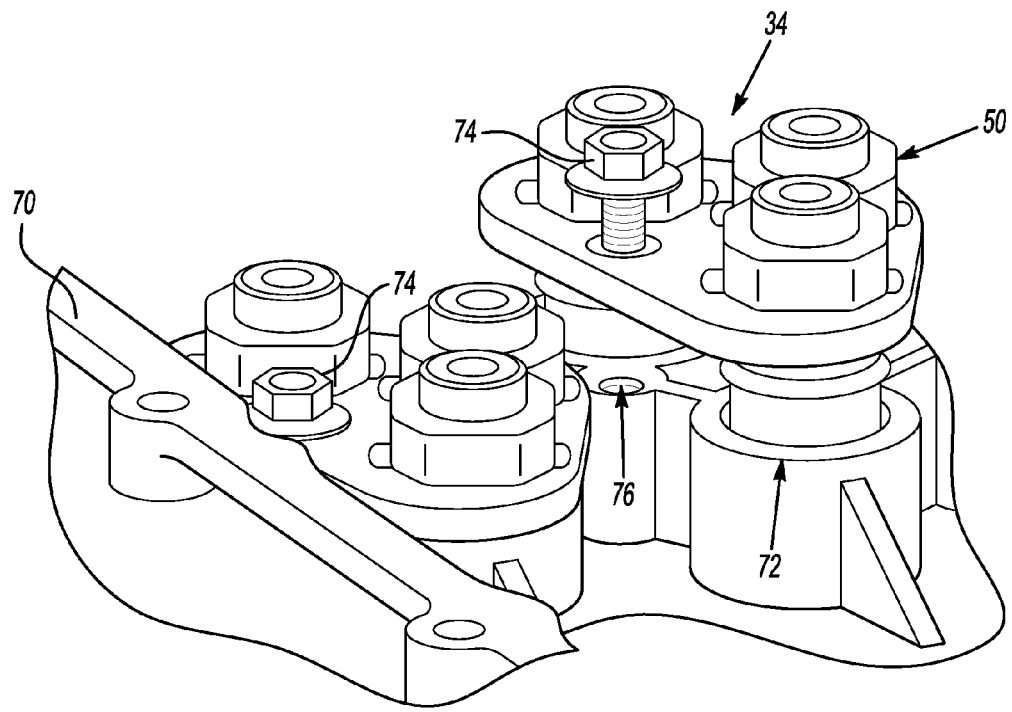
FIG. 4 is a schematic perspective view illustration of a pair of AC connector rod assemblies during installation to a transmission case according to an example embodiment.

Referring to FIG. 4, as noted above with reference to FIG. 1 the AC connector rod assemblies 18 may be used as part of an electrical system 10 within a vehicle. In such an embodiment, a transmission case 70 may encapsulate a portion of the electric machine 16 shown in FIG. 1. In the example configuration shown in FIG. 4, two AC connector rod assemblies 18 are used to connect the PIM 14 of FIG. 1 to two different electric machines 16, e.g., a pair of three-phase, high-voltage electric traction motors of the typed used within a hybrid electric vehicle.

The electric machine(s) 16 in such an embodiment may be positioned immediately adjacent to the transmission case 70, with the transmission case 70 defining a set of bore holes 72. The construction of the AC connector rod assemblies 18 allows the AC connector rods 30 to freely float within the carrier plate 34 as explained above. As a result, the rods 30 can be easily inserted into the bore holes 72 during assembly and installation without requiring the use of alignment pins or other additional alignment features, unlike conventional individually-assembled or over-molded AC connector rod assemblies.

Once the AC connector rod assemblies 18 have been inserted into the bore holes 72 of the transmission case 70, the insulating housings 32 self-align within the bore holes 72. For example, the flattened side walls 48 of the AC connector rods 30, as best shown in FIG. 2, may align with a similar rectangular profile within the terminal block 20 of FIG. 1 such that a particular alignment must present itself for full insertion of the rods 30 into the bore holes 72. Thereafter, the carrier plate 34 may be attached to the transmission case 70 using a set of fasteners 74. The remainder of the electrical system 10 of FIG. 1 may be connected in any suitable manner, e.g., by connecting a bus bar of the AC bus 15 shown in FIG. 1 to the end 52 of the AC connector rod 30.

While the best modes for carrying out the invention have been described in detail, those familiar with the art to which this invention relates will recognize various alternative designs and embodiments for practicing the invention within the scope of the appended claims.

The invention claimed is:

1. An electrical system comprising:
 an alternating current (AC) connector rod assembly; and
 a polyphase electric machine having a plurality of phase leads, each of which is electrically connected to the AC connector rod assembly;
 wherein the AC connector rod assembly includes:
  a plurality of spaced AC connector rods each having a center axis;

a carrier plate defining a plurality of bosses each having a through hole, wherein the through holes receive and space the AC connector rods; and a plurality of insulating housings each defining a slot; and wherein each of the bosses of the carrier plate defines a tabular extension that engages a respective one of the slots of the insulating housings while allowing each of the AC connector rods to rotate about its respective center axis within the carrier plate.

2. The electrical system of claim 1, wherein the plurality of through holes equals the number of phases of the polyphase electric machine, and wherein the carrier plate defines the set of features adjacent to the through holes.

3. The electrical system of claim 1, further comprising a first and a second plurality of o-rings, wherein each of the insulating housings defines a circumferential groove that receives a corresponding one of the first plurality of o-rings, and each of the AC connector rods defines another circumferential groove that receives a corresponding one of the second plurality of o-rings.

4. The electrical system of claim 1, further comprising:

a power inverter module (PIM) that is electrically connected to each of the phase leads via the AC connector rod assembly.

5. The electrical system of claim 1, wherein the polyphase electric machine is a traction motor that delivers output torque to a set of vehicle drive wheels.

6. The electrical system of claim 1, wherein each of the AC connector rods includes a flange positioned adjacent to the corresponding through holes of the carrier plate, and wherein the flange has an outer diameter that is larger than the diameter of the through holes.

7. An alternating current (AC) connector rod assembly for use with a polyphase electric machine, the assembly comprising:

a plurality of spaced AC connector rods each having a center axis, wherein each of the AC connector rods has flattened side walls defining a bore;

a carrier plate defining through holes that receive and space the AC connector rods; and a plurality of insulating housings, each of which circumscribes a respective one of the AC connector rods and defines a slot, wherein each of the flattened side walls with the defined bores extends axially outward from a respective one of the insulating housings;

wherein the carrier plate defines a plurality of bosses each having a tabular extension that engages a respective one of the slots defined by the insulating housings while allowing each of the AC connector rods to rotate about its respective center axis within the carrier plate during installation of the AC connector rod assembly via the bore and flattened side walls to the polyphase electric machine.

8. The assembly of claim 7, further comprising a first and a second plurality of o-rings, wherein each of the insulating housings defines a circumferential groove that receives a corresponding one of the first plurality of o-rings, and wherein each of the AC connector rods defines another circumferential groove that receives a corresponding one of the second plurality of o-rings.

9. The assembly of claim 7, wherein each of the AC connector rods includes a flange positioned adjacent to the corresponding through holes of the carrier plate, and wherein the flange has an outer diameter that is larger than the diameter of the through holes.

10. The assembly of claim 7, wherein the carrier plate and the insulation housings are constructed of molded plastic, and wherein the AC connector rods are constructed of aluminum.

\* \* \* \* \*